Dec. 20, 1960     F. E. CONDER ET AL     2,964,789
PLASTIC MOLDING APPARATUS
Filed April 14, 1958     3 Sheets-Sheet 1

INVENTORS,
FOREST E. CONDER.
BRYCE W. GIBSON.
BY
Lockwood, Galt, Woodard & Smith.
ATTORNEYS.

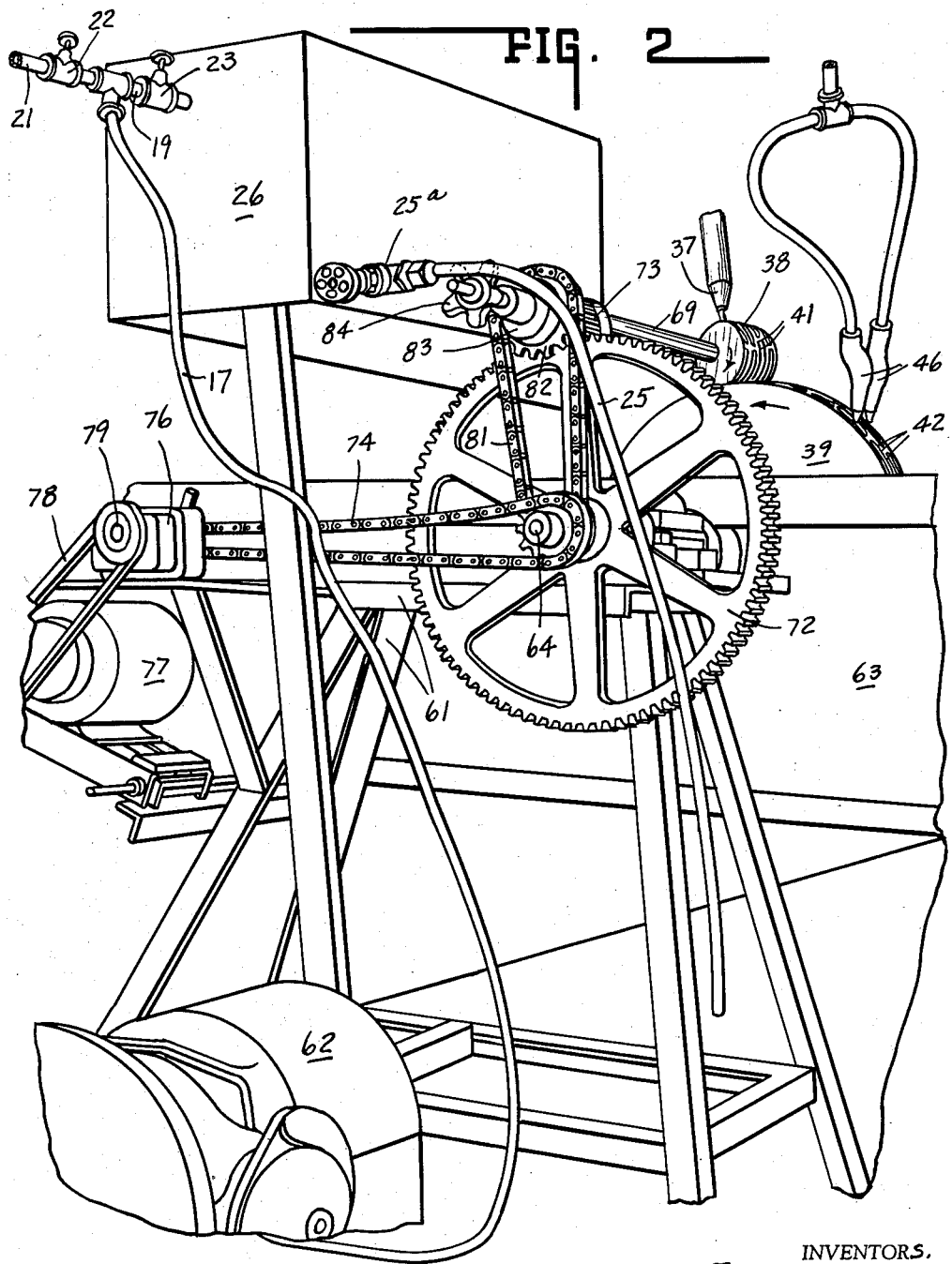

Dec. 20, 1960  F. E. CONDER ET AL  2,964,789
PLASTIC MOLDING APPARATUS

Filed April 14, 1958  3 Sheets-Sheet 3

INVENTORS.
FOREST E. CONDER.
BRYCE W. GIBSON.
BY
Lockwood, Galt, Woodard & Smith.
ATTORNEYS.

United States Patent Office 2,964,789
Patented Dec. 20, 1960

2,964,789

PLASTIC MOLDING APPARATUS

Forest E. Conder, 2507 Valley Ave., Marion, Ind., and Bryce W. Gibson, 3750 S. Adams St., Marion, Ind.

Filed Apr. 14, 1958, Ser. No. 728,130

8 Claims. (Cl. 18—21)

This invention relates generally to apparatus for the molding of small objects from a plastic material and in particular to high production molding apparatus providing a product which is characterized by negligible match line.

In the manufacture of small, low cost, plastic objects, such as fish lures, it is important that the producing apparatus be capable of turning out a large number of the objects in a minimum of time and with a minimum of operational steps. The trimming of flashing from the molded product is particularly time consuming. Another important problem in molding small objects, such as artificial angle worms, is that involved with providing the finished product with a life-like appearance. One factor in providing the required life-like appearance is the reduction to a minimum of the match line which is formed at the juncture of the mold cavities during the molding operation. In any molding apparatus wherein the product is formed by superimposing matching cavities carried in two movable members, it is also important that the material, assuming a thermoplastic material is to be utilized, be introduced into the cavities at the correct temperature and with the contents of the cavity transferred to the desired one of the movable members when such members are separated during the molding process.

It is the object of the present invention, therefore, to provide an apparatus for high production molding of small plastic objects, the apparatus providing for the continuous flow of the material through curing and molding operations into a finished product.

A further object of the present invention is to provide an apparatus for molding small objects in which the flashing is automatically trimmed during the molding process, leaving the object with a negligible match line.

A further object of the present invention is to provide an apparatus of the type referred to above in which the differential cooling of the surfaces of the mold cavity contents is utilized to transfer the contents of the cavities from one molding wheel to another.

A further object of the present invention is to provide an apparatus of the type referred to above which utilizes edge abutting molding wheels in which the flow of material and the speed of travel of the molding wheels can be independently controlled.

The full nature of the invention will be understood from the accompanying drawings and the following description and claims:

Fig. 2 is a perspective view showing the actual form of a portion of the apparatus shown in Fig. 1.

The molding apparatus of the present invention forms objects from a plastic material by means of molding cavities located on the periphery of two molding wheels. The cavities in the periphery of the wheels may be shaped, designed or machined to give the desired external appearance of the finished product. The number of cavities in one wheel may be equal to, or a multiple of, the number of cavities in the other wheel, so long as the mechanical drivers of the individual wheels are properly synchronized to keep the cavities in the two wheels properly matched, as will subsequently be explained.

One of the molding wheels is beveled to provide a cutting action against the other wheels whereby flashing is automatically removed as the product is molded, resulting in a negligible match line on the finished product. The material is deposited onto one of the wheels at the correct temperature and the correct distance from the sector of contact of the wheels to allow for sufficient cooling of the material and thereby effecting a release of the product from one wheel and its retention by the other wheel.

Figure 1:
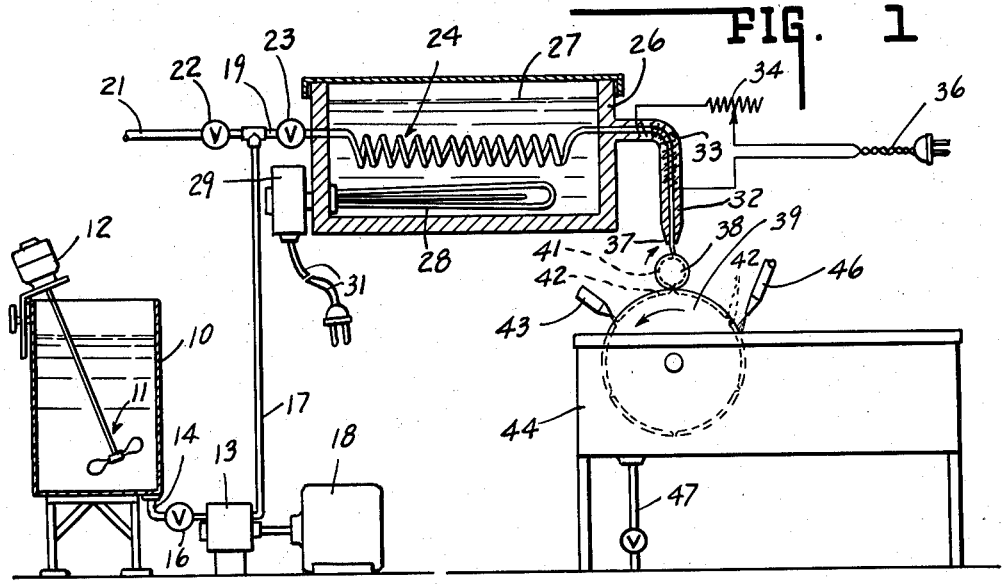
Fig. 1 is a schematic view of the molding apparatus embodying the present invention.

The apparatus for carrying out the functions set out above will now be described with initial reference to Figs. 1, 4 and 5. In Fig. 1 there is shown at 10 a molding compound supply tank having mounted therein an agitating apparatus 11 powered by a suitable electric motor 12. The tank contains a volume of fluid formed by a mixture of conventional resins and plasticizers, the compound thereby formed being of a conventional type which remains in the fluid state until heated to the fusing temperature, which may be of the order of 310° F., and subsequently cooled. A fluid pump 13 serves to draw the compound through a line 14 and a control valve 16 and delivers it into a fluid line 17. The pump is driven by a conventional variable drive mechanism indicated generally at 18.

The line 17 is connected into a line 19, one section 21 of which is connected through a valve 22 to a compressed air supply line. It will be understood that compressed air may be introduced into the line 19 through the valve 22 for cleaning the fluid lines; however, the valve 22 remains closed during the molding operation.

At its other end the line 19 is connected through a valve 23 to a coiled conduit 24. The coiled conduct extends through an insulated tank 26 containing heat transfer oil, the general level of the oil in the tank being indicated at 27. The oil is heated to the required fusion temperature of the molding compound by means of a conventional immersion heater and thermostat indicated generally at 28. The switch portions of the heater and thermostat are housed in the control box 29 which may be connected to a source of power (not shown) by means of the power lead 31. The output end of the coiled conduit communicates with a delivery tube 32 which is insulated thermally and provided with a heating element 33 disposed in heat exchange relation with the tube. The heating element may be controlled by a suitable rheostat, indicated at 34, and may be connected to a suitable source of electric power by means of the power lead 36.

The outlet end of the delivery type is provided with a nozzle 37 spaced above a molding wheel 38. The molding wheel 38 is mounted for rotation in peripherally aligned relation to a second molding wheel 39. As indicated by arrows in Fig. 1, the molding wheels are rotated by a drive means, to be subsequently described, in opposite directions with the peripheral edges of the wheels in contact with each other.

Figure 4:
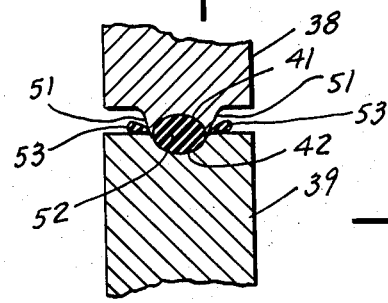
Fig. 4 is an enlarged sectional view illustrating the coaction of the two molding wheels.
Figure 5:
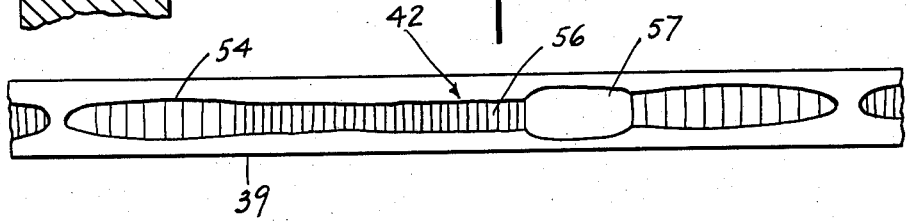
Fig. 5 is a top plan view of the surface of the peripheral edge of one of the molding wheels illustrating the configuration of the molding cavity used for producing artificial angle worms.

As shown in broken lines in Fig. 1, and as may be seen in Fig. 4, the molding wheel 38 is provided with a single elongated cavity 41 at its marginal edge and cooperates with a series of matching cavities 42 in the molding wheel 39. As shown in Fig. 1, the wheel 39 has ten separate, end-abutting cavities along its peripheral edge and the wheel 38 has a single elongated cavity. It will be evident that by properly synchronizing the rotation of the two wheels at a one to ten speed ratio, the cavities in the two wheels will be maintained in matching relation as the wheels rotate relative to each other.

As indicated generally at 43, a stream of cooling water is directed against the wheel 39, the water being caught in a drain tank 44 from which it may be released by means of the drain line 47. A compressed air line, having a discharge nozzle 46 directs a stream of air against the periphery of the wheel 39 to strip therefrom the molded objects at the completion of the molding cycle as will subsequently be explained.

In operation, the rotation of the molding wheels is properly synchronized and the pump 13 is operated at the speed required for proper flow of the molding compound through the system. As the compound is forced through the coiled conduit its temperature is raised to its fusion point, transforming the compound into a homogenous, viscous fluid which will set upon subsequent cooling. As the fluid is forced through the delivery tube, its viscosity is maintained by the heating means 33. The fluid flows from the nozzle 37 and into the cavity 41 formed in the peripheral groove of the molding wheel 38.

The molding wheels are formed of steel, having substantial thermal conductivity, and, as the contents of the cavity is rotated toward the sector of contact beween the two molding wheels, the inner surface of the cavity contents loses heat to and is cooled by the molding wheel 38. The outer surface of the cavity contents, while cooled somewhat by heat exchange with the surrounding air, remains at a higher temperature than the inner surface of the cavity contents. Because of the differential in temperature between the outer and inner surfaces thereby provided, the material is transferred to the matching cavity 42 in the wheel 39 as the wheels rotate through their sector of contact. As the wheel 39 rotates further, the contents of the filled cavities 42 (those to the left of the sector of contact in Fig. 1) are cooled but remain in adhering relation with the cavities until they are removed by the air blast issuing from the nozzle 46. The air blast serves to strip the molded objects from the cavities 42 from which they may be permitted to fall into suitable receptacles (not shown).

It will be noted that the process is continuous in that the fluid may be delivered in a continuous stream from the nozzle 37 and will be molded at the sector of contact of the molding wheels as the two wheels are rotated relative to each other.

Referring principally to Fig. 4, it may be seen that one of the wheels is provided with beveled edges 51 along the margins of cavity formed therein. This beveled edge, cooperating with the adjacent molding wheel, provides a cutting action at the margins of the molded object 52 which automatically removes the flashing 53 therefrom. The molded product is thus provided with a minimum or negligible match line.

It will be understood that the cavities 41 and 42 in the molding wheels are provided with a surface which provides the required configuration for the object to be molded. As will be apparent from Fig. 5, when the molded products are to be artificial angle worms, the cavity may be provided with a surface which properly outlines the flattened tail section 54, the spaced muscle ribs 56 and the band of tissue forming the clitellum 57. With the cavities properly surfaced, the molded objects are provided with a very life-like configuration.

Figure 3:
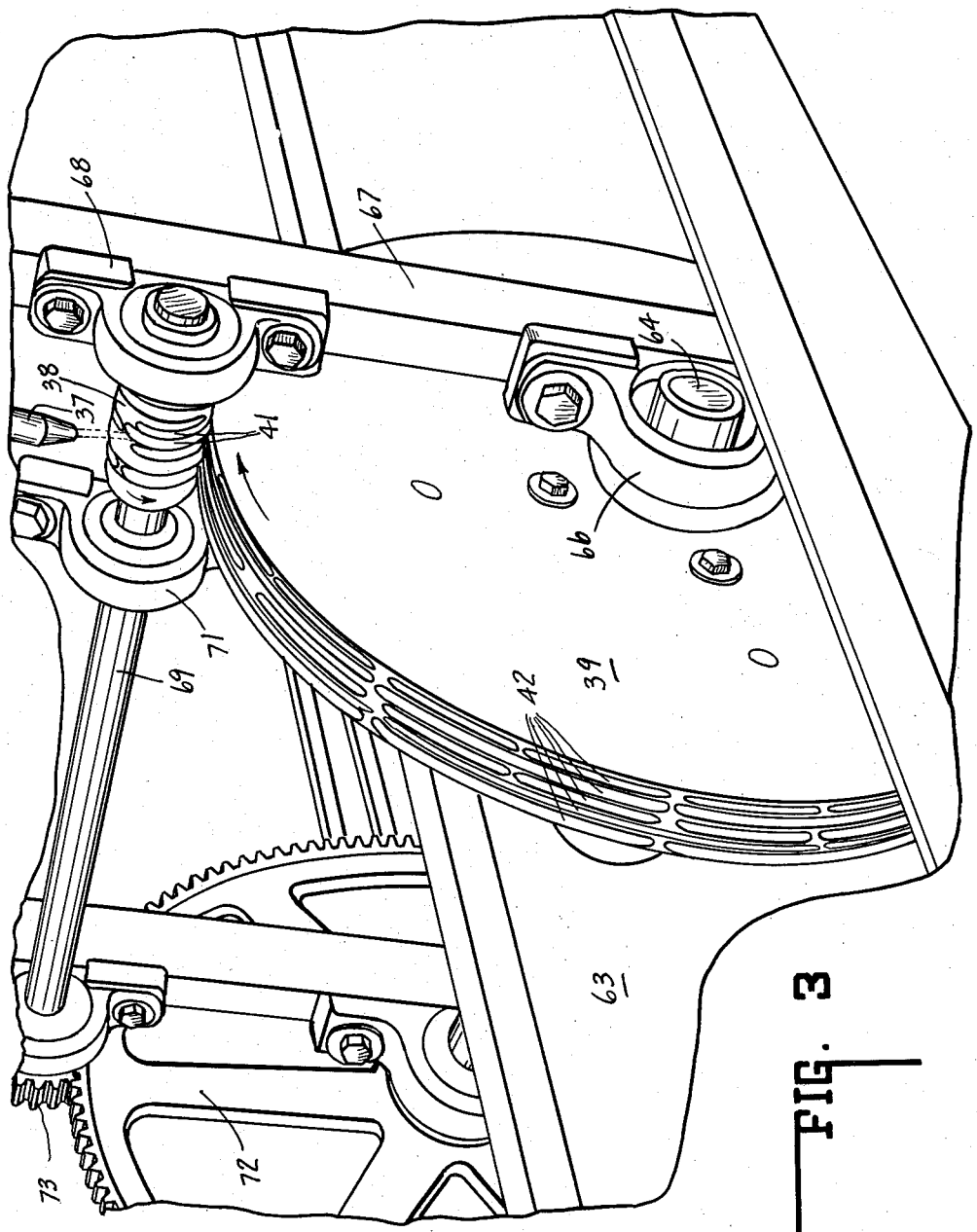
Fig. 3 is a perspective view showing the molding wheels.

Referring now to Figs. 2 and 3, a description will be made of an actual embodiment of the apparatus, as contrasted to the schematic showing of Fig. 1, with particular attention to the driving means for the molding wheels. In Figs. 2 and 3, components finding their counterparts in Fig. 1 will be given the same reference numerals as used in Fig. 1.

In Fig. 2 reference numeral 61 indicates generally an angle iron frame upon which is mounted the insulated tank 26. The pump 13 and its driving means 18 are indicated generally at 62, and deliver molding compound through the line 17 communicating with the coiled conduit disposed within the tank 26. A drain line 25 and a valve 25a permit the heat transfer oil contained within the tank 26 to be drained therefrom.

A plate 63 forms one side of the drain tank indicated at 44 in Fig. 1, and has extending freely therethrough a shaft 64. As may be seen in Fig. 3, the shaft 64 is supported by means of a pillow block 66, secured by means of a band 67 to a pillow block 68 mounted on the supporting framework. The shaft 64 carries rotatably mounted thereon the molding wheel 39. The molding wheel extends downwardly within the drain tank and at its peripheral edge is provided with a plurality of parallel grooves, each of which is separated at the intervals to provide a series of molding cavities 42. The cavities 42 are formed similar to those described with reference to Fig. 1, the wheel 39 shown in Fig. 3 differing only in that multiple parallel grooves are provided to form the molding cavities. Supported above the shaft 64 is a second shaft 69, journaled in pillow blocks 68 and 71. The shaft 69 has rotatably mounted thereon the molding wheel 38 which also is provided at its marginal edge with parallel peripheral grooves forming cavities 41, matching the cavities 42 in the wheel 39.

As may be seen in Fig. 2, adjacent the outer surface of the plate 63, the shaft 64 carries a large gear 72 which, as shown by broken lines, meshes with a small gear 73 carried on the shaft 69.

The driving means for the shaft 64 is provided by means of a sprocket and chain 74 which is linked to a sprocket (not visible in Fig. 2) carried by a conventional variable speed gear box 76. The input to the gear box is provided by an electric motor 77 connected by means of a belt 78 to the input shaft 79. The shaft 64 is provided with an additional sprocket means cooperating with a chain 81, which engages a sprocket 82 carried by the shaft 69. A conventional spring-loaded clutching member 83 having an adjusting handle 84 extends from the end of shaft 69 and provides a slipping clutch linkage between the sprocket 82 and the shaft 69.

From the foregoing it will be evident that the motor 77 serves to drive the gear 72 which in turn drives the small gear 73, with the auxiliary drive linkage provided by the chain 81 and sprocket 82 serving to eliminate the back lash between the gears 72 and 73. The relative size of the gears 72 and 73 is such as to rotate the molding wheels 39 and 38, respectively, at the required speed ratio, with the matching cavities in the wheels also having a corresponding numerical ratio. It will be evident that various speed ratios might be provided between the two molding wheels, it being required, however, that the number of matching cavities in the two wheels be correspondingly altered.

While the present invention has been particularly described as being embodied in an apparatus for molding thin, elongated objects, such as artificial angle worms, it will be evident that by properly forming the cavities in the respective molding wheels, objects having other configurations might similarly be molded.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A device for forming objects from a thermoplastic material or material of similar viscosity, said device comprising a pair of peripherally abutting wheels, means for rotating said wheels in opposite directions with one wheel having a speed which has a whole integer relation to the speed of the other wheel and having its axis disposed above the axis of the other wheel, the facing peripheral margin of one of said wheels being formed to provide at least one elongated cavity therein, the facing peripheral margin of the other wheel having matching elongated cavities formed therein arranged in end-to-end relation, the number of cavities in said other wheel having a whole integer relation to the number of cavities in said one wheel depending on the speed ratio between said wheels, the surfaces of said cavities being formed to correspond to the outline of the object to be formed, means for introducing thermoplastic material into the peripheral cavity in said one wheel at a point thereon remote from the sector of contact of said wheels whereby the inner surface of said material is cooled and solidified by heat loss to said one wheel and the still fluid material supported on the solidified inner surface flows into the matching cavity in said other wheel and is retained therein as the wheels rotate beyond their sector of contact, the longitudinal cavity margins on one of said two wheels being beveled to cut away the flashing at the contacting sector of said wheels, means for removing heat from said other wheel to complete the solidification and cooling of said material, and air operated means for stripping the solidified objects from said other wheel.

2. A device for forming objects from a thermoplastic material or material of similar viscosity, said device comprising a pair of peripherally abutting wheels, means for rotating said wheels in opposite directions with one wheel having a speed which has a whole integer relation to the speed of the other wheel and having its axis disposed above the axis of the other wheel, the facing peripheral margin of one of said wheels being formed to provide at least one elongated cavity therein, the facing peripheral margin of the other wheel having matching elongated cavities formed therein arranged in end-to-end relation, the number of cavities in said other wheel having a whole integer relation to the number of cavities in said one wheel depending on the speed ratio between said wheels, the surfaces of said cavities being formed to correspond to the outline of the object to be formed, means for introducing material into the peripheral cavity in said one wheel at a point thereon remote from the sector of contact of said wheels whereby the inner surface of said material is cooled and solidified by heat loss to said one wheel and the still fluid material supported on the solidified inner surface flows into the matching cavity in said other wheel and is retained therein as the wheels rotate beyond their sector of contact, and means for removing heat from said other wheel to complete the solidification and cooling of said material.

3. A device for forming objects from a thermoplastic material, said device comprising a pair of peripherally abutting wheels, means for rotating said wheels in opposite directions with one wheel having a speed which has a whole integer relation to the speed of the other wheel and having its axis disposed above the axis of the other wheel, the facing peripheral margin of one of said wheels being formed to provide at least one elongated cavity therein, the facing peripheral margin of the other wheel having matching elongated cavities formed therein arranged in end-to-end relation, the number of cavities in said other wheel having a whole integer relation to the number of cavities in said one wheel depending on the speed ratio between said wheels, the surfaces of said cavities being formed to correspond to the outline of the object to be formed, means for introducing thermoplastic fluid into the peripheral cavity in said one wheel at a point thereon remote from the sector of contact of said wheels whereby the inner surface of said fluid is cooled and solidified by heat loss to said one wheel and the still fluid material supported on the solidified inner surface flows into the matching cavity in said other wheel and is retained therein as the wheels rotate beyond their sector of contact, the longitudinal cavity margins on one of said two wheels being beveled to cut away the flashing at the contacting sector of said wheels, and means for removing heat from said other wheel to complete the solidification and cooling of said fluid.

4. A device for forming objects from a plastic material, said device comprising a pair of peripherally abutting wheels, the axis of one wheel being disposed above the other wheel axis, means for rotating said wheels in opposite directions with one wheel having a speed which has a whole integer relation to the speed of the other wheel, the facing peripheral margin of the upper one of said wheels being formed to provide at least one elongated cavity therein, the facing peripheral margin of the other wheel having matching elongated cavities formed therein arranged in end-to-end relation, the number of cavities in said other wheel having a whole integer relation to the number of cavities in said one wheel depending on the speed ratio between said wheels, the surfaces of said cavities being formed to correspond to the outline of the object to be formed, means for introducing thermoplastic material into the peripheral cavity in said one wheel at a point thereon remote from the sector of contact of said wheels, said material being transferred to the registering cavity in said other wheel as the wheels move through their sector of contact, the longitudinal cavity margins on one of said two wheels being beveled to cut away the flashing at the contacting sector of said wheels.

5. A device for forming objects from a plastic material, said device comprising a pair of peripherally abutting wheels, the axis of one wheel being disposed above the other wheel axis, means for rotating said wheels in opposite direction with one wheel having a speed which has a whole integer relation to the speed of the other wheel, the facing peripheral margin of the upper one of said wheels being formed to provide at least one elongated cavity therein, the facing peripheral margin of the other wheel having matching elongated cavities formed therein arranged in end-to-end relation, the number of cavities in said other wheel having a whole integer relation to the number of cavities in said one wheel depending on the speed ratio between said wheels, the surfaces of said cavities being formed to correspond to the outline of the object to be formed, and means for introducing said plastic material into the peripheral cavity in said upper one of said wheels for transferal to the cavities in said other wheel.

6. A system for forming objects from a thermoplastic material including means for delivering a fluid compound of resins and plasticizers to a conduit, means including a heat transfer oil bath for said conduit, the temperature of said oil bath being maintained at or somewhat above the fusion temperature of said compound, a delivery tube communicating with said conduit and terminating in a fluid delivery nozzle, means cooperating with said delivery tube to maintain the elevated temperature of said fluid flowing therethrough, a first molding wheel having a cavity in its peripheral edge mounted for rotation adjacent said delivery nozzle, said cavity being adapted to receive fluid issuing from said nozzle, a second molding wheel having a peripheral cavity and disposed in edge abutting relation with said first wheel for rotation therewith, the contacting sector of said wheels being spaced from the point of introduction of said fluid on said first wheel, whereby the contents of the cavity in said first wheel are transferred to the cavity in said second wheel as said wheels rotate through their contacting sector, and means for stripping the contents of the cavity in said second wheel to thereby complete the formation of said objects.

7. A system for forming objects from a thermoplastic material including means for delivering a compound of resins and plasticizers to a conduit, heat transfer means for said conduit, said heat transfer means maintaining said compound at or above its fusion temperature, a delivery tube communicating with said conduit and terminating in a fluid delivery nozzle, a first molding wheel having a cavity in its peripheral edge mounted for rotation adjacent said delivery nozzle, said cavity being adapted to receive fluid issuing from said nozzle, a second molding wheel having at least one peripheral cavity and disposed in edge abutting relation with said first wheel for rotation therewith, the contacting sector of said wheels being spaced from the point of introduction of said fluid on said first wheel, whereby the contents of the cavity in said first wheel are transferred to the cavity in said second wheel as said wheels rotate through their contacting sector, and means for stripping the contents of the cavity in said second wheel to thereby complete the formation of said objects.

8. A system for forming objects from a thermoplastic material including means for delivering a fluid compound of resins and plasticizers to a conduit, means including a heat transfer means for said conduit, said heat transfer means maintaining said compound at or above its fusion temperature, a delivery tube communicating with said conduit and terminating in a fluid delivery nozzle, means cooperating with said delivery tube to maintain the elevated temperature of said fluid flowing therethrough, a first molding wheel having a cavity in its peripheral edge mounted for rotation adjacent said delivery nozzle, said cavity being adapted to receive fluid issuing from said nozzle, a second molding wheel having at least one peripheral cavity and disposed in edge abutting relation with said first wheel for rotation therewith, the contacting sector of said wheels being spaced from the point of introduction of said fluid on said wheels, whereby the contents of the cavity in said first wheel are transferred to the cavity in said second wheel as said wheels rotate through their contacting sector.

References Cited in the file of this patent
UNITED STATES PATENTS

| | | |
|---|---|---|
| 215,006 | Lampert et al. | May 6, 1879 |
| 1,624,849 | Steele et al. | Apr. 12, 1927 |
| 2,310,748 | Pearson | Feb. 9, 1943 |

FOREIGN PATENTS

| | | |
|---|---|---|
| 528,872 | Germany | July 7, 1931 |